United States Patent [19]

Hotta et al.

[11] Patent Number: 4,656,619

[45] Date of Patent: Apr. 7, 1987

[54] SUPERVISING AND CONTROLLING SYSTEM FOR A COMMUNICATION STATION IN A TDMA COMMUNICATION SYSTEM

[75] Inventors: Toshinori Hotta; Yuuhei Ishi, both of Tokyo, Japan

[73] Assignee: NEC Corporation, Japan

[21] Appl. No.: 723,099

[22] Filed: Apr. 15, 1985

[30] Foreign Application Priority Data

Apr. 16, 1984 [JP]  Japan .................................. 59-76221
Apr. 16, 1984 [JP]  Japan .................................. 59-76222

[51] Int. Cl.⁴ ............................ H04J 1/16; H04J 3/06
[52] U.S. Cl. ........................................ 370/13; 370/104
[58] Field of Search ................... 370/104, 100, 13, 17, 370/110.1

[56] References Cited

U.S. PATENT DOCUMENTS 3,924,078 12/1975 Bussey ..................................... 370/13
4,315,330 2/1982 Brickman et al. .................... 370/104
4,340,788 7/1982 Sbuelz ..................................... 370/17
4,388,715 6/1983 Renaudin et al. ...................... 370/13

Primary Examiner—Douglas W. Olms
Assistant Examiner—Frank M. Scutch, III
Attorney, Agent, or Firm—Laff, Whitesel, Conte & Saret

[57] ABSTRACT

A supervising and controlling system for a TDMA equipment in a TDMA station designates one of two control memories in the TDMA equipment as a spare one with the other as operating one by a memory selection signal from a supervisory and control apparatus. The content of the spare memory is periodically verified by the significant control data from the control apparatus. When non-coincidence is detected by the verification, the significant control data is transmitted to the TDMA equipment and is written into the spare control memory without interfering with other stations.

Two similar TDMA equipments are provided in the station and controlled by the control apparatus in the similar manner. One of the equipments can be selectively used as an operating one by equipment selection signals from the control apparatus.

13 Claims, 12 Drawing Figures

SUPERVISING AND CONTROLLING SYSTEM FOR A COMMUNICATION STATION IN A TDMA COMMUNICATION SYSTEM

BACKGROUND OF THE INVENTION

1. Field of the Invention

The present invention relates to a time-division multiple access (TDMA) communication system, and in particular, to a supervising and controlling system for at least one TDMA equipment in a communication station.

2. Description of the Prior Art

The TDMA communication system is a method for enabling a plurality of communication stations to communicate with one another through one repeater apparatus, and is employed especially in the field of satellite communication system.

In the TDMA system, a plurality of communication stations have respective time slots assigned thereto for communication between respective stations. Each station transmits its burst of communication in every time slots allotted thereto so that communication between respective stations can be performed on a time division basis without any time overlap of the signals transmitted from the various communication stations. In order to maintain such a time-division communication, it is essential for each station that its burst of communication is reliably controlled to be correctly transmitted in its own time slot. Each burst signal usually comprises a preamble burst portion and a data burst portion including sub-bursts.

In each communication station, a TDMA communication equipment usually has two first and second memories each storing transmission and reception burst signal control data (or burst time plan data) for designating a time position and a time length of each burst portions. The TDMA equipment operates under control by the burst signal control data stored in the first memory.

A parity code or an error detecting code is usually added to the burst signal control data in the prior art so that any error of the control data can be detected.

When an error is caused in the control data of the operating first memory by a certain reason, it is switched over to the second memory so that the TDMA communication can be maintained.

After switching over to the second memory, the content of the first memory must be rewritten into the correct burst signal control data so that the first memory stands by as a spare memory.

To this end, a known system has an apparatus for supervising and controlling the TDMA equipment. The supervisory and control apparatus periodically monitors the TDMA equipment, and upon detecting a control data error signal from the first memory after being switched to a spare one, the supervisory and control apparatus transfers the correct control data to the TDMA equipment so as to replace the contents of the first memory by the correct control data.

The supervisory and control apparatus also has a function to change the previous burst signal control data into new burst signal control data. When a change of the control data is required, the supervisory and control apparatus restrains the TDMA equipment from automatically switching over to the spare memory from the operating one, transfers the new control data to the spare memory, and thereafter designates the spare memory as a new operating one, with the previous operating memory being changed to a new spare one. Then, the TDMA equipment operates according to the new control data. Thereafter, the supervisory and control apparatus writes the new control data into the new spare memory, and then releases the restraint of the automatic switching from the operating memory to the spare memory.

In the known system, although it is automatically carried out at the TDMA equipment to switch over from an operating memory to a spare memory at a time when an error is caused in the burst signal control data of the operating memory, it is not performed at once to replace the damaged control data by the correct control data because the supervisory and control apparatus does not always monitor those memories. Accordingly, there is a problem that the TDMA equipment operates for a certain time period without any stand-by memory.

In a write-in operation of a burst signal control data into a memory, it can not be detected that the control data could not be transferred to the memory due to any damage of the transfer circuit. Therefore, the memory is handled as one storing the correct control data. Switching the memory to an operating one results in an interference of communication between respective stations in the TDMA communication system.

SUMMARY OF THE INVENTION

It is an object of the present invention to provide a supervising and controlling system for a TDMA equipment in a communication station in a TDMA communication system wherein two memories in the TDMA equipment are periodically checked up to readily detect any error caused in the burst signal control data stored in the memories, without interfering with other bursts.

It is another object of the present invention to provide a supervising and controlling system for a TDMA equipment wherein, when detecting any error of the burst signal control data stored in any one of the two memories in the TDMA equipment, it is immediately carried out to rewrite the correct data into the memory.

It is still another object of the present invention to provide a supervising and controlling system for a TDMA equipment wherein verification of the burst signal control data written into a memory is performed subsequent to the write-in operation.

According to the present invention, a supervising and controlling system for a communication station in a TDMA communication system is obtained which comprises a supervisory and control apparatus and a TDMA equipment in the station, the TDMA equipment having two control memory means to be used as an operating one and a spare one, respectively, each control memory means storing burst signal control data for designating a time position and length of each component burst of each of burst signals transmitted from and received at the TDMA equipment.

The supervisory and control apparatus comprises storage means for storing significant burst signal control data, means for transmitting a memory selection signal to the TDMA equipment for designating one of two memory means as an operating one with the other as a spare one, means for periodically transmitting said significant burst signal control data to the TDMA equipment, means for periodically transmitting a verification signal to the TDMA equipment for commanding to verify the significant burst signal control data and the content stored in the memory means, means for measuring an elapsed time from the transmission of the burst signal control data and producing a time-over signal after lapse of a predetermined time period, means for detecting a coincidence signal caused by verification of the TDMA equipment in response to the time over signal and providing a coincidence detecting signal upon detecting the coincidence signal, means for controlling the memory selection signal transmitting means, the significant burst signal control data transmitting means, the verification signal transmitting signal, the measuring means, and the coincidence signal detecting means.

The memory selection signal is inverted so that the operating condition and the spare condition of the two memory means are changed to each other. Two memory means can be alternatively verified.

The TDMA equipment comprises means for switching the two memory means to an operating condition and a spare condition, respectively, in dependence on the memory selection signal, means for reading out the content in one of the two memories which is switched to the spare condition in response to the verification signal, and means for comparing the significant burst signal control data transmitted from the supervisory and control apparatus and the read-out data, and on coincidence of both data, generating the coincidence signal.

According to the supervising and controlling system, any error of burst signal control data can be readily detected.

The supervisory and control apparatus further comprises means for transmitting a writing signal to the TDMA equipment for commanding to write said significant burst control data into the memory means. The TDMA equipment further comprises means for writing the significant burst signal control data into one of the two memories which is switched to the spare condition in response to the writing signal.

When the coincidence signal detecting means detects no coincidence signal, the control means drives the writing signal transmitting means in place of the verification signal transmitting means in response to said non-coincidence signal, and drives the significant burst signal control data transmitting means.

Therefore, when any error of the data stored in the memory is detected, the operation for rewriting the significant data can be automatically performed. The control means drives the verification signal generating means in place of the writing signal transmitting means, and drives the significant burst signal control data transmitting means, after a predetermined time period from transmitting the writing signal.

Accordingly, the written data in the memories can be automatically verified just after the writing operation.

According to one aspect of the present invention, the supervisory and control apparatus supervises and controls two similar TDMA equipments. One of the two TDMA equipments is designated as an operating one and the other is a stand-by one. When the coincidence signal is not obtained by verification in the operating equipment, the supervisory and control apparatus switches over to the stand-by one.

Further objects, features and other aspects will be understood from the following detailed description of preferred embodiments referring to the accompanying drawings.

DETAILED DESCRIPTION OF PREFERRED EMBODIMENTS

Figure 1:
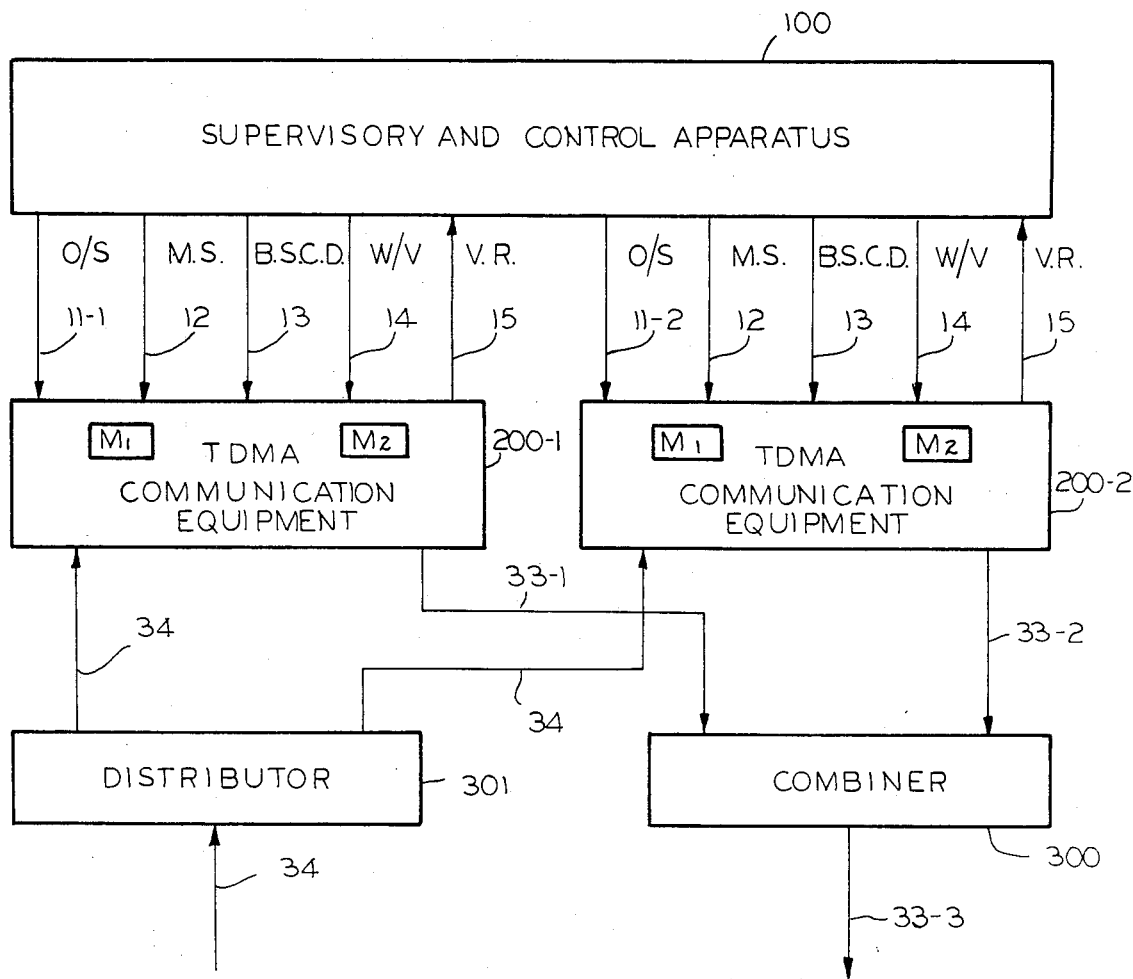
FIG. 1 is a general block circuit diagram view illustrating an embodiment according to the present invention.

Referring to FIG. 1, an embodiment of the present invention comprises a supervisory and control apparatus 100 for supervising and controlling two TDMA communication equipments 200-1 and 200-2 which are provided for a communication station in a TDMA communication system. These two TDMA equipments 200-1 and 200-2 are used for operating and stand-by ones selectively, under control by supervisory and control apparatus 100.

TDMA equipments are provided with transmission output terminals, respectively, which are connected to a combiner 300. Therefore, burst signals 33-1 and 33-2 of communication from respective TDMA equipments 200-1 and 200-2 are combined at combiner 300 and are supplied to an antenna (not shown) as a transmission signal.

A TDMA signal 34 received at an antenna (not shown) is fed to a distributor 301 and is distributed to TDMA equipments 200-1 and 200-2.

In order to establish respective equipments 200-1 and 200-2 in operating and spare conditions selectively, operating/stand-by selection signals (O/S) 11-1 and 11-2 are applied to TDMA equipments 200-1 and 200-2, respectively. When one of the operating/stand-by selection signals is "1", the corresponding equipment is established at an operating condition. While, the other operating/stand-by selection signal is "0", to establish the other equipment in a stand-by condition.

Each TDMA equipment of 200-1 and 200-2 is provided with two memories $M_1$ and $M_2$, each storing burst signal control data. Two memories $M_1$ and $M_2$ in each TDMA equipment are selectively established to an operating condition and a spare condition by a memory selection signal (M.S.) 12 which is supplied from supervisory and control apparatus 100 to each TDMA equipment of 200-1 and 200-2. When the memory selection signal (M.S.) 12 is "0", one memory $M_1$ is established in an operating condition with the other $M_2$ being established in a spare condition. On the contrary, the M.S. signal 12 is changed to be "1" to make memory $M_2$ in an operating condition, while the other $M_1$ being in a spare one.

One of two TDMA equipments, for example, 200-1 is selected as an operating one by the operating/stand-by selection (O/S) signal 11-1, and carries out the transmitting and receiving operation under control of the burst signal control data stored in one memory, for example, $M_1$ which is selected by the memory selection (M.S.) signal 12 from supervisory and control apparatus 100 to the operating TDMA equipment 200-1.

Supervisory and control apparatus 100 has a function for writing the burst signal control data into respective memories $M_1$ and $M_2$ in respective TDMA equipments 200-1 and 200-2, and the other function for periodically verifying the burst signal control data stored in respective memories $M_1$ and $M_2$ of respective TDMA equipments 200-1 and 200-2.

To this end, supervisory and control apparatus 100 provides the burst signal control data (B.S.C.D.) 13 for writing-in or verifying to respective TDMA equipments 200-1 and 200-2. In order to selectively indicate a write-in operation and a verifying operation, a write-in/verifying (W/V) selection signal 14 is also provided to respective TDMA equipments 200-1 and 200-2 from supervisory and control apparatus 100. In the verifying operation, each TDMA equipment of 200-1 and 200-2 provides a signal 15 for representing the verification result (V.R.).

Figure 2:
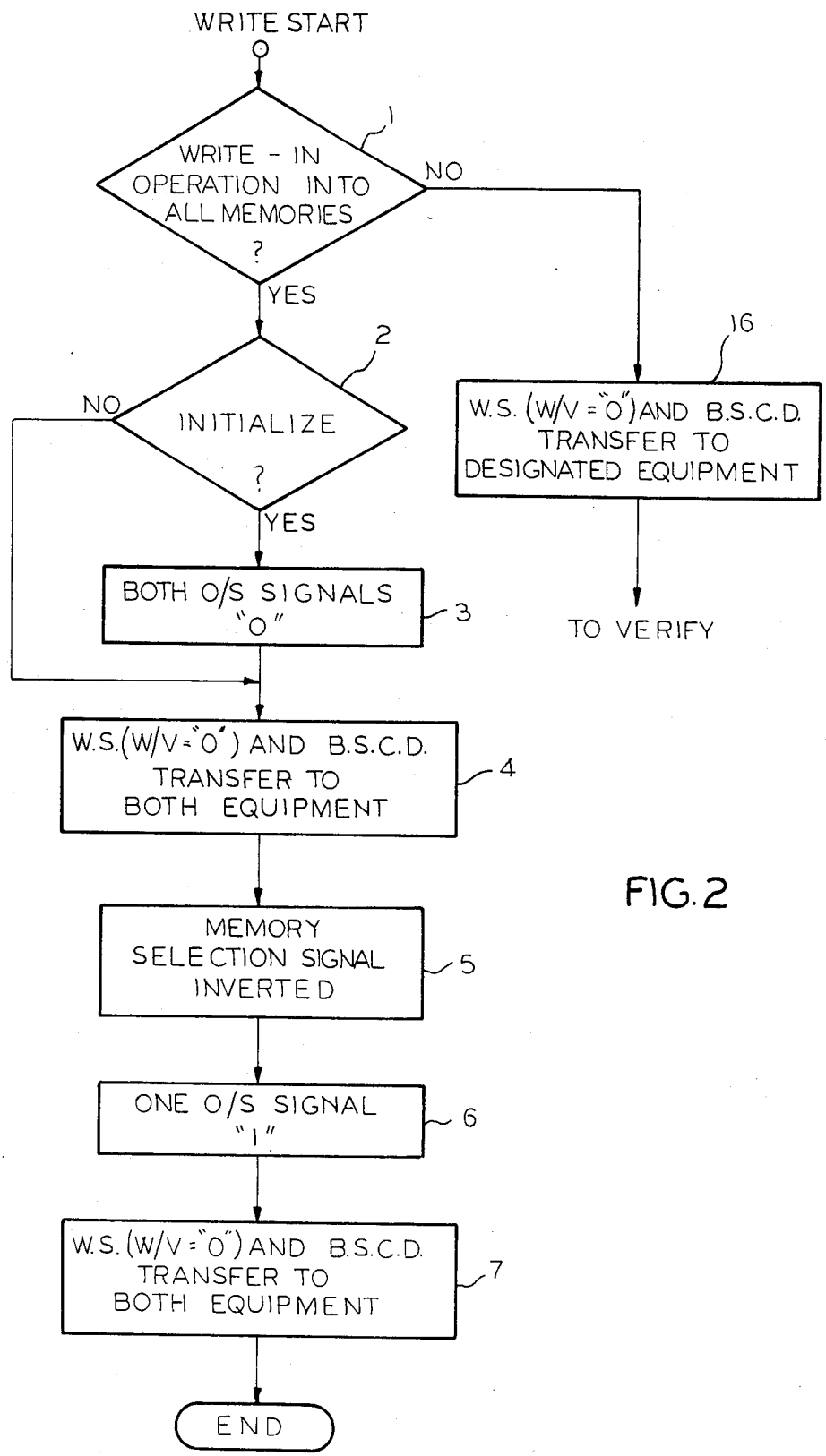
FIG. 2 is a flow chart illustrating a data writing control operation by a supervisory and control apparatus in the embodiment of FIG. 1.
Figure 3:
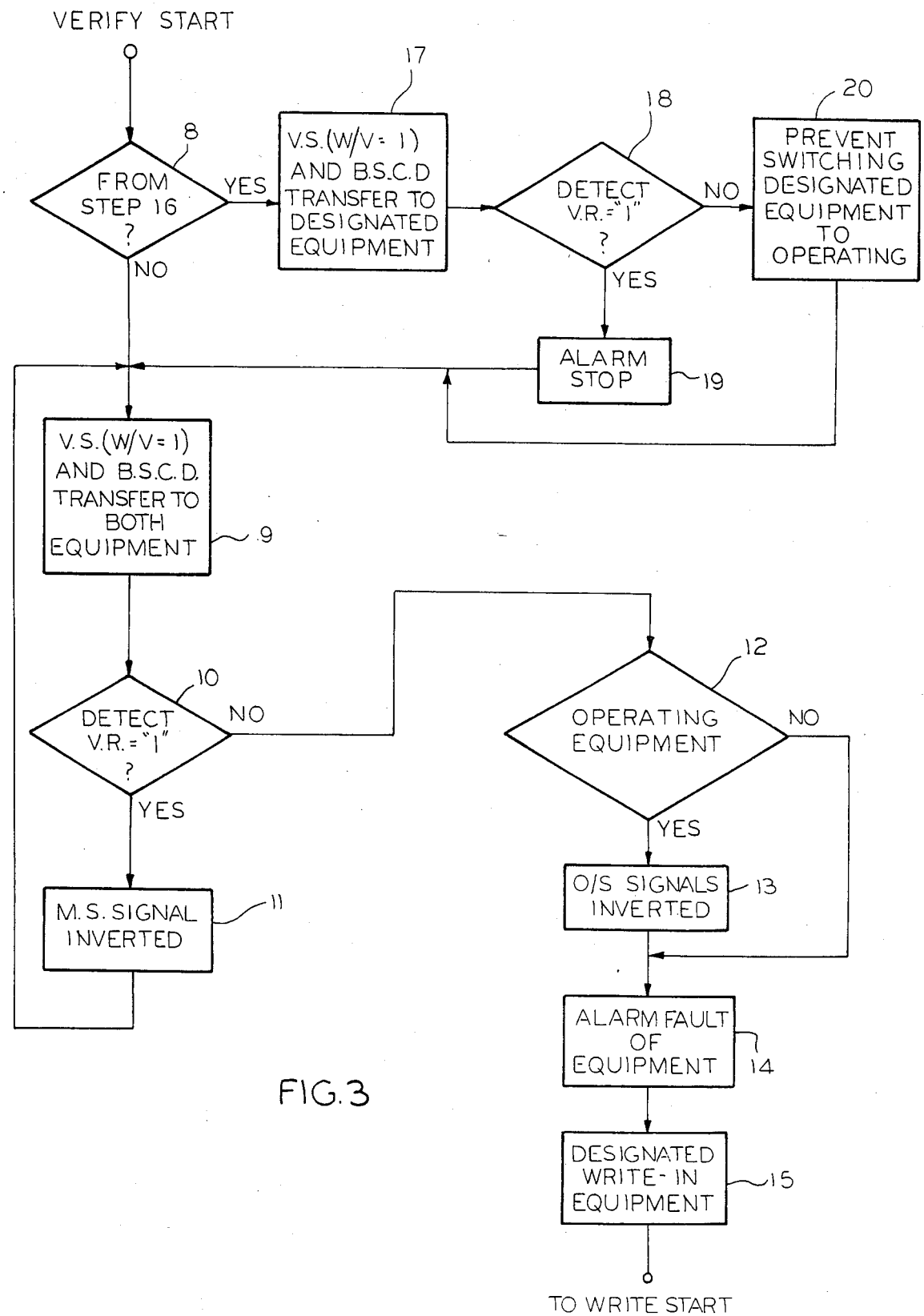
FIG. 3 is a flow chart illustrating a data verifying control operation by the supervisory and control apparatus.

The operation of the supervisory and control apparatus 100 will be described in connection with flow charts as shown in FIGS. 2 and 3.

When none of memories $M_1$ and $M_2$ of respective equipments 200-1 and 200-2 store the burst signal control data, for example, at a start condition of the communication station, supervisory and control apparatus 100 carries the write-in operation as shown in FIG. 2.

Since it is required to write the burst signal control data into all memories, both operating/stand-by selection (O/S) signals 11-1 and 11-2 are made "0" at step 3 subsequent to step 2 after step 1. Both TDMA equipments 200-1 and 200-2 are established in non-operating condition in the TDMA communication system.

Then, the write-in/verifying selection (W/V) signal 14 is made "0" to represent the write-in operation, and the burst signal control data are transferred to respective TDMA equipments 200-1 and 200-2, as illustrated by step 4 in FIG. 2.

Each memory selection (M.S.) signal 12 is either one of "1" and "0". Therefore, one of the two memories $M_1$ and $M_2$ in each equipment of 200-1 and 200-2 is in an operating condition, while the other is in a non-operating or spare condition. Now providing that memory $M_1$ in each TDMA equipment is in an operating condition (M.S. signal being "0").

The transferred burst signal control data are written into non-operating memories M in both equipments 200-1 and 200-2.

Supervisory and control apparatus 100 thereafter inverts the both memory selection (M.S.) signals 12, namely, from "0" to "1", as indicated by step 5 in FIG. 2, so that memories $M_2$ are changed into the operating condition, while the other memories $M_1$ are placed in the non-operating condition. Then, one of the operating/spare selection (O/S) signals 11-1 and 11-2 is changed to "1", as illustrated by step 6 in FIG. 2. Thus, one TDMA equipment, for example, 200-1 is placed in the operating condition, and carries out its TDMA transmitting and receiving operation under control of the burst signal control data stored in memory $M_2$ therein.

After step 6, supervisory and control apparatus 100 transfers the burst signal control data to respective equipments 200-1 and 200-2 with the write-in/verifying selection signal being maintained "0", as illustrated by step 7 in FIG. 2. Thus, the burst signal control data are written into memories $M_1$ in respective TDMA equipments 200-1 and 200-2.

When it is required to change the current burst signal control data by new burst signal control data, the similar writing operation is carried out along steps 1 to 7. However, since the writing operation is not initial, step 4 is carried out subsequent to step 2. In step 5, two operating/stand-by signals to both equipments are inverted with respect to each other. That is, one signal is changed from "1" to "0" and the other from "0" to "1".

Thus, changing operation of the burst signal control data can be carried out without interfering with the other bursts.

The burst signal control data as stored in respective memories are, thereafter, periodically verified by supervisory and control apparatus 100 so as to readily detect any fault of the stored burst signal control data.

The verifying operation will be described referring to FIG. 3 which illustrates a flow chart of the verifying operation.

When the verifying operation starts after step 8 in FIG. 2, supervisory and control apparatus 100 changes the write-in/verifying selection (W/V) signals 14 into "1" to represent the verifying operation mode and transfers the verifying burst signal control data (B.S.C.D.) 13 to respective TDMA equipments 200-1 and 200-2, as illustrated by step 9 subsequent to step 8 in FIG. 3.

In each TDMA equipments 200-1 and 200-2, the contents of memories $M_1$ which are in the non-operating or spare condition are read out and are compared with the verifying burst signal control data. Results of the verification (V.R.) are transferred to supervisory and control apparatus 100 from respective equipments 200-1 and 200-2. When the content in the non-operating memory coincides with the verifying data, the verification result (V.R.) signal is "1". On the contrary, when they do not coincide with each other, the verification result (V.R.) signal is "0".

Supervisory and control apparatus 100 operates to detect the verification result (V.R.) signals 15, as illustrated by step 10 in FIG. 3, after a predetermined time period from transfer of the burst signal control data in step 9. The time period is determined by taking into consideration a time required to the verifying operation in each TDMA equipment.

When it is detected that the verification result (V.R.) signals 15 are "1", supervisory and control apparatus 100 inverts the memory selection (M.S.) signals 12, namely, from "1" to "0", as illustrated by step 11 in FIG. 3.

As a result, memory $M_1$ in each equipment is changed to the operating condition and memory $M_2$ is switched to the non-operating condition. The operating TDMA equipment 200-1 carries out its TDMA transmitting and receiving operation under control of the burst signal control data stored in memory $M_1$.

Thereafter, supervisory and control apparatus 8 again transfers the burst signal control data (B.S.C.D.) 14 to respective equipments 200-1 and 200-2 with the write-in/verifying selection (W/V) signal 14 being maintained "1", so as to verify the contents in memory $M_2$, as illustrated by step 9 in FIG. 3.

Similar the verifying operation from step 9 to step 11 is thereafter repeated periodically, so that the data stored in two memories $M_1$ and $M_2$ in each TDMA equipment 200-1 and 200-2 are alternatively checked up.

In the above description, the verification operation of two memories in each TDMA equipment is alternatively carried out one after another. However, it can be modified so that after the verification of one memory is repeated over a predetermined number of times, the other memory is verified.

In other modification, the two memories in the stand-by TDMA equipment are alternatively verified but only the spare memory is verified in the operating TDMA equipment.

During the verifying operation, when it is not detected at step 10 that the verification result (V.R.) signal 15 from one of the two TDMA equipments is "1", supervisory and control apparatus 100 checks up whether the TDMA equipment providing no verification result (V.R.) signal 15 of "1" is the operating one or the stand-by one, as illustrated by step 12 in FIG. 3. When it is the operating one, supervisory and control apparatus 100 inverts the operating/stand-by selection (O/S) signals 11-1 and 11-2. In the present case, the operating/stand-by selection (O/S) signal 11-1 is changed from "1" to "0", while the other signal 11-2 is changed from "0" to "1". Therefore, the operating TDMA equipment is switched from equipment 200-1 to 200-2. The TDMA equipment 200-2 carries out the TDMA transmitting and receiving operation under control of the burst signal control data stored in the operating one of the two memories $M_1$ and $M_2$ thereof.

Thereafter, supervisory and control apparatus 100 provides an alarm or an indication for noticing a fault of the TDMA equipment 200-1 as illustrated by step 14 in FIG. 3.

When the non-operating or stand-by TDMA equipment 200-2 is detected at step 12, the step 14 is performed to notice a fault of the non-operating TDMA equipment 200-2 without carrying out step 13.

Thereafter, supervisory and control apparatus 100 designates the non-operating TDMA equipment, for example, 200-1, as illustrated by step 15 in FIG. 3, so as to rewrite the burst signal control data into the memory, for example, $M_1$ having an erroneous data, and perform a rewriting operation.

Referring to FIG. 2 again, since one write-in equipment is designated at step 15 in FIG. 3, the rewriting operation mode is detected at step 1. Therefore, supervisory and control apparatus 100 changes the write-in/verifying selection (W/V) signal 14 to the designated TDMA equipment 200-1 from "1" to "0" and transfers the burst signal control data (B.S.C.D.) to the designated TDMA equipment, as illustrated by step 16 in FIG. 2.

Then, the designated TDMA equipment 200-1 rewrites the burst signal control data (B.S.C.D.) into the memory $M_1$.

Thereafter, the supervisory and control apparatus 100 carries out a verifying operation for checking up whether the burst signal control data is rewritten into the memory $M_1$ correctly or not.

Referring to FIG. 3 again, since the verification operation is subsequent to step 16, supervisory and control apparatus 100 carries out step 17 after step 8. That is, the write-in/verifying selection (W/V) signal 14 to the designated TDMA equipment 200-1 is changed from "0" to "1", and the burst signal control data (B.S.C.D.) signal is transferred to TDMA equipment 200-1. Then, the content in the memory $M_1$ in TDMA equipment 200-1 is read out and compared with the transferred data. The result of the verification is transferred to supervisory and control apparatus 100.

After the predetermined time period from step 17, supervisory and control apparatus 100 checks the verification result (V.R.) signal 15 from TDMA equipment 200-1, as illustrated by step 18 in FIG. 3. When it is detected that the verification result (V.R.) signal is "1", the TDMA equipment 200-1 is judged to be normal. Then, the alarm or indication is stopped at step 19. Thereafter, supervisory and control apparatus 100 again carries out the similar operation from step 9.

When it is not detected at step 18 that the verification result (V.R.) signal 15 is "1", the TDMA equipment 200-1 is judged to be non-recoverable and is prevented from being switched to an operating equipment, as illustrated by step 20 in FIG. 3.

Thereafter, supervisory and control apparatus 100 again carries out the similar operation from step 9, but in connection with the single TDMA equipment 200-2.

In the above description, the two TDMA equipments 200-1 and 200-2 are verified at a same time, but can be alternatively verified.

In FIG. 1, two TDMA equipments 200-1 and 200-2 are provided in a communication station, but the communication station can be provided with a single TDMA equipment. In the case, supervisory and control apparatus 100 operates in the similar manner as illustrated in FIGS. 2 and 3, except that it supervises and controls a single equipment. Therefore, step 13 is omitted, and the verification operation is not continued after step 20.

Figure 4:
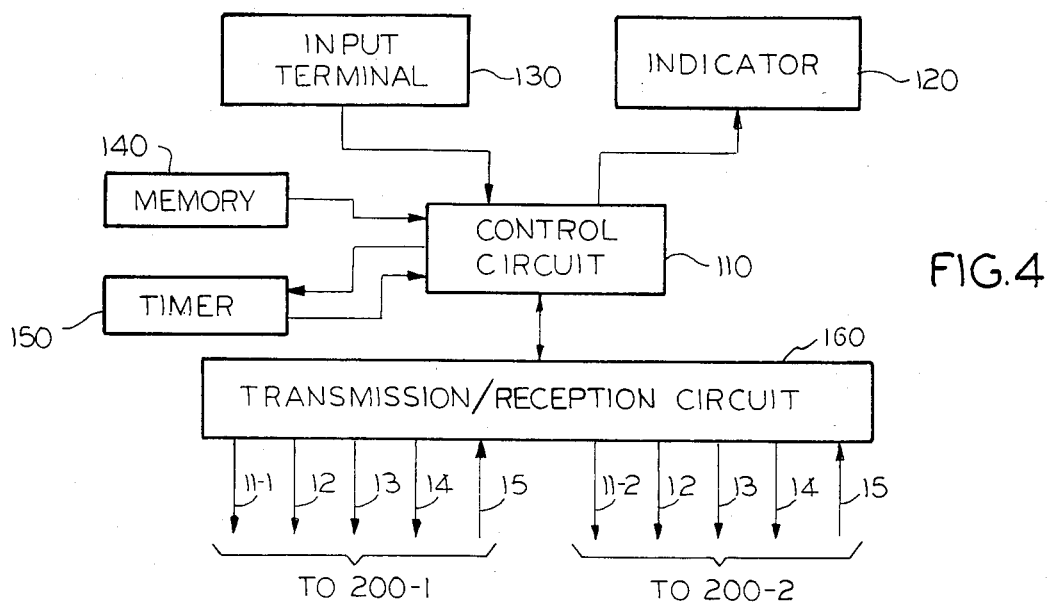
FIG. 4 is a block diagram view illustrating the supervisory and control apparatus in the embodiment.

Referring to FIG. 4, the supervisory and control apparatus 100 shown therein comprises a control circuit 110, an indicator 120, an input terminal 130, a memory 140, a timer 150 and a transmission/reception circuit 160.

Control circuit 110 has functions to carry out the operation illustrated in the flow charts in FIGS. 2 and 3, that is, applies the operating/stand-by selection (O/S) signals 11-1 and 11-2, the memory selection (M.S.) signals 12, the burst signal control data (B.S.C.D.) 13 and the write-in/verifying selection (W/V) signals 14 to TDMA equipments 200-1 and 200-2 at predetermined times through transmission/reception circuit 160. Control circuit 110 also receives the verification result (V.R.) signals 15 through transmission/reception circuit 160.

Indicator 120 is, for example, a cathode ray tube (CRT) and for displaying contents stored in memory 140 and information inputted from input terminal. Indicator 120 also indicates the fault of a TDMA equipment.

Input terminal 130 is, for example, a key board for inputting various information such as new burst signal control data, and commanding display of contents in memory 140.

Memory 140 stores the burst signal control data and various conditions of TDMA equipments 200-1 and 200-2, which are used in control circuit 110 for performing the operation as shown by the flow charts in FIGS. 2 and 3.

Timer 150 measures an elapsed time from the operation of the step 8 or 16 in FIG. 3 and notifys control circuit 110 at a time when it should perform the detecting steps 9 or 17 in FIG. 3.

Various signals 11 to 14 can be supplied to each TDMA equipment of 200-1 and 200-2 through respective signal lines, but can be also supplied thereto as a time-serial data signal through a data transmission line.

Figure 5:
FIG. 5 is a view illustrating a format of a set of burst signal control data.

Referring to FIG. 5, the burst signal control data comprises two parts, one of which is a data portion I for controlling transmission, the other portion II being for controlling reception.

Two TDMA communication equipments 200-1 and 200-2 have the same construction and operates in the similar manner to each other. Therefore, a description will be made in connection with a single TDMA communication equipment, below.

Figure 6:
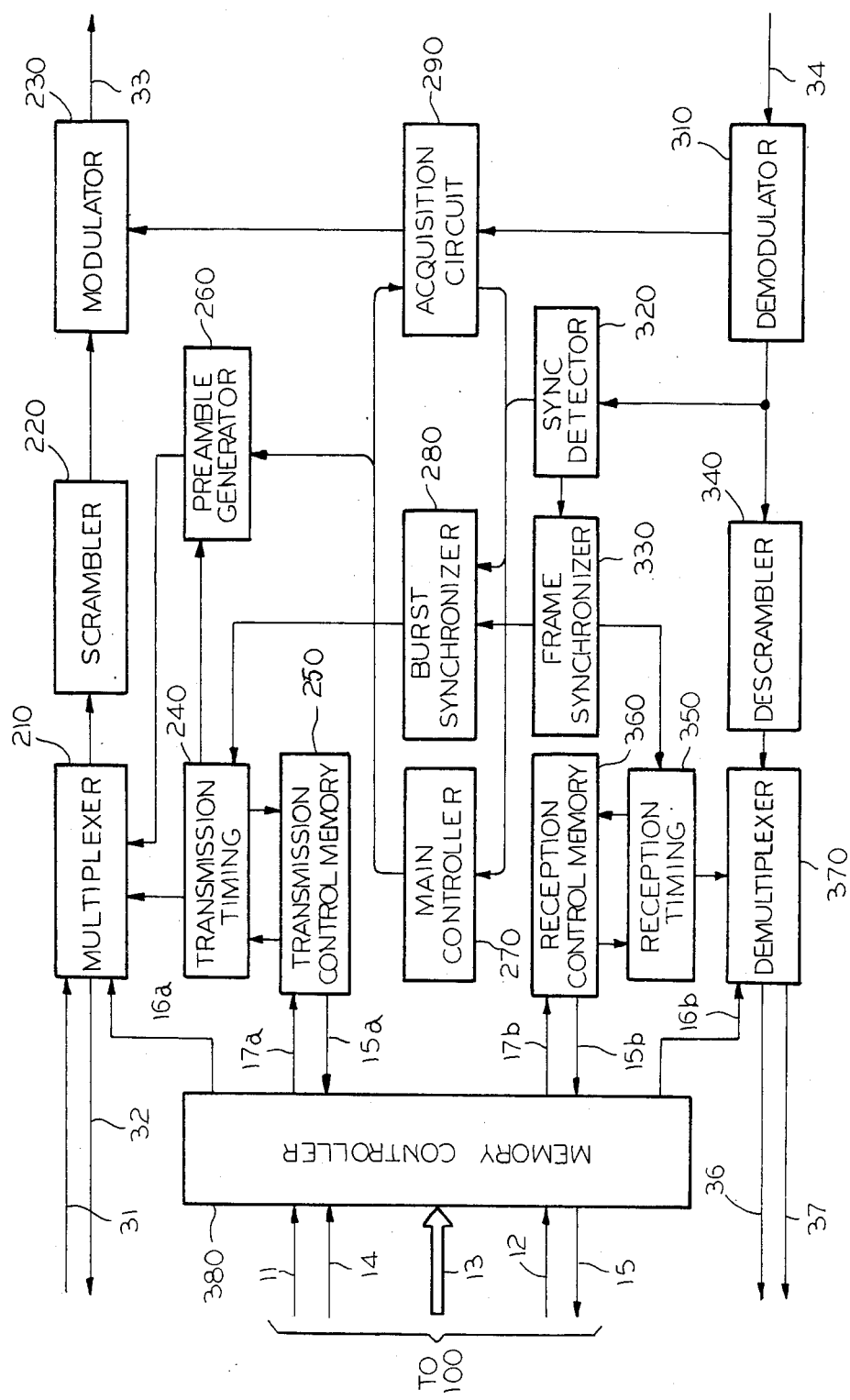
FIG. 6 is a block diagram of a TDMA equipment in FIG. 1.

Referring to FIG. 6, a TDMA equipment shown therein comprises a multiplexer 210, a scrambler 220, a modulator 230 and a preamble generator 260 for generating a transmitting burst signal 33 from a plurality of sub-burst signals 31 from a plurality of, for example, digital speech interpolation (DSI) interfaces (not shown) and a preamble signal from preamble generator 260.

Multiplexer 210 combines sub-burst signals 33 and the preamble signal to form a composite signal. The composite signal is scrambled at scrambler 220 and is, thereafter modulated at modulator 230, from which the transmission burst signal 33 is obtained.

Figure 7:
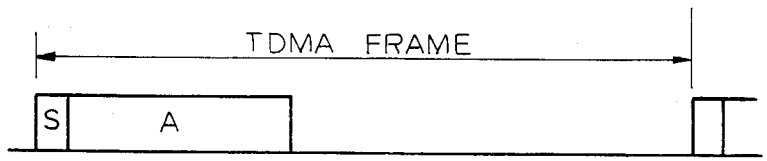
FIG. 7 is a view illustrating a transmitting burst signal format in a TDMA frame.

Referring to FIG. 7, the transmission burst signal comprises a preamble portion S and a transmission data portion A as well known in the art.

The transmission burst signal must be entered into a preassigned time slot in each TDMA frame. Therefore, the time lengths and positions of the burst signals 31 and the preamble signal are controlled by a transmission timing generator 240 and a main controller 270.

Transmission timing generator 240 generates timing signals, which are supplied to multiplexer 210 and preamble generator 260. Then, multiplexer 210 supplies sub-burst control signals 32 to the DSI interface (not shown) in response to the timing signal. As a result, sub-burst signals are supplied to multiplexer 210 according to the timing signals. The preamble signal is also supplied to multiplexer 210 from preamble generator 260 under control of main controller 270 according to the timing signals.

In transmission timing generator 240, the timing signals are generated from the transmission burst signal control data (I in FIG. 5) stored in a transmission control memory 250 in synchronization with a burst synchronizing signal from a burst synchronizer 280.

Transmission control memory 250 comprises two memory units which are alternatively switched between the operating condition and the non-operating or spare condition, as described hereinafter. It will be clearly understood that the operating one provide the transmission burst signal control data to transmission timing generator 240.

Burst synchronizer 280 generates the burst synchronizing signal on the basis of signals extracted in the TDMA signal received at the TDMA equipment as will be explained hereinafter.

As a result, the transmission burst signal 33 is transmitted timely not to overlap bursts from the other stations in the TDMA communication system.

The shown TDMA equipment further comprises an acquisition circuit 290, a demodulator 310, a SYNC detector 320 and a frame synchronizer 330, so as to synchronize its own transmitting and receiving operation to the TDMA signal in the TDMA system.

Acquisition circuit 290 is a circuit for transmitting the local burst into the preassigned time slot of the TDMA frame without interfering with the other bursts at a time when the station intends to join the TDMA communication system.

The received TDMA signal 34 is demodulated at demodulator 310.

Figure 8:
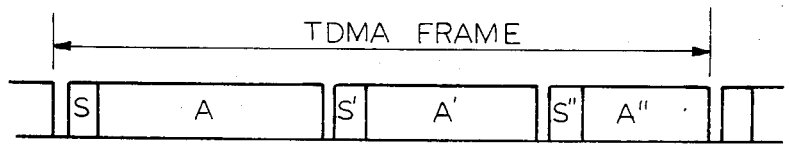
FIG. 8 is a view illustrating a TDMA frame format.

Referring to FIG. 8, one frame of the received TDMA signal has a plurality of (for example, three) non-overlapped bursts transmitted from three communication stations. Those three bursts comprise preamble portions S, S' and S" and communication portions A, A' and A", respectively.

The demodulated signal is supplied to SYNC detector 320, where synchronizing signals are extracted from the demodulated signal. The extracted synchronizing signals are supplied to burst synchronizer 280, main controller 270 and a frame synchronizer 330.

The frame synchronizer 330 generates a frame synchronizing signal on the basis of the synchronizing signals from SYNC detector 320. The frame synchronizing signal is supplied to burst synchronizer 280 and a reception timing generator 350.

Burst synchronizer 280 as described above generates the synchronizing signal from the frame synchronizing signal and the extracted synchronizing signals.

The demodulated signal is also supplied to descrambler 340 and is fed to demultiplexer 370 therefrom.

A reception control memory 360 has two memory units which are alternatively switched between an operating condition and a non-operating or spare condition, as will be described hereinafter. Each memory unit stores the reception burst signal control data (II in FIG. 5).

Reception timing generator 350 reads out the reception burst signal control data from the operating memory unit of reception control memory 360 in response to the frame synchronizing signal, and controls demultiplexer 370 according to the reception burst signal control data.

Demultiplexer 370 separates the burst signal in a time slot assigned to the station into sub-bursts 36, which are transferred to, for example, DSI interfaces (not shown) together with control signals 37.

Since the arrangement and transmitting-receiving operation of the TDMA equipment in a communication station as known in the prior art and since the present invention is not directed to them, further detailed description of them will be omitted.

According to the present invention, the TDMA equipment as shown in FIG. 6 further comprises a memory controller 380 for controlling transmission and reception control memories 250 and 360, multiplexer 210 and demultiplexer 370, in response to operating/standby selection (O/S) signal 11, memory selection (M.S.)

signal 12, write-in/verifying selection (W/V) signal 14 from supervisory and control apparatus 100 in FIG. 1.

Memory controller 380 receives the burst signal control data (B.S.C.D.) from supervisory and control apparatus 100 and transfers the data to memories 250 and 360, and also transfers the verification result (V.R.) signal 15 to supervisory and control apparatus 100.

When the received operating/stand-by selection (O/S) signal 11 is "1", the TDMA equipment is indicated as an operating equipment. Memory controller 380 provides an operating signals 16a and 16b to multiplexer 210 and demultiplexer 370. Therefore, the equipment performs the above-described transmitting and receiving operation.

When the received operating/stand-by selection (O/S) signal 11 is "0", the TDMA equipment is indicated as a non-operating or stand-by equipment. Memory controller changes the operating signals 16a and 16b into non-operating signals to stop operation of multiplexer 210 and demultiplexer 370. As a result, transmitting and receiving operation of the TDMA equipment is prevented.

When memory controller 380 transfers memory selection (M.S.) signal 12, write-in/verifying selection (W/V) signal 14, and the received burst signal control data (B.S.C.D.) together with an address reset signal and a data sampling signal to transmission and reception control memories 250 and 360, as indicated by arrows 17a and 17b in FIG. 6.

In this connection, the burst signal control data (B.S.C.D.) is separated at the controller into the transmission control data portion and the reception control data portion (I and II in FIG. 5), which are transferred to memories 250 and 360, respectively. The address reset signal and the data sampling signal are generated at memory controller 380.

Upon receiving those signals, transmission and reception control memories 250 and 360 carry out a write-in operation or a verifying operation, as will be described hereinafter.

In verifying operation, verification result signals 15a and 15b are provided from respective memories 250 and 360 to memory controller 380. Then, memory controller 380 sends out the verification result (V.R.) signal 15 to supervisory and control apparatus 100.

Figure 9:
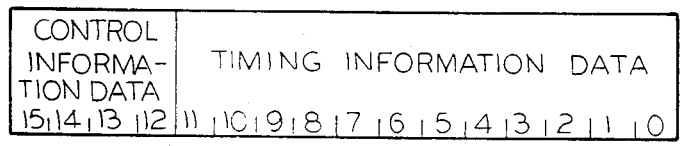
FIG. 9 is a view illustrating an arrangement of a word of the burst signal control data.

Transmission and reception control data portions I and II of the burst signal control data (B.S.C.D.) have a similar format. An example of the format is illustrated in FIG. 9, which comprises a timing data portion of 12 bits and a control information data portion of 4 bits.

The transmission and reception control memories 250 and 360 are similar to each other in the arrangement.

Figure 10:
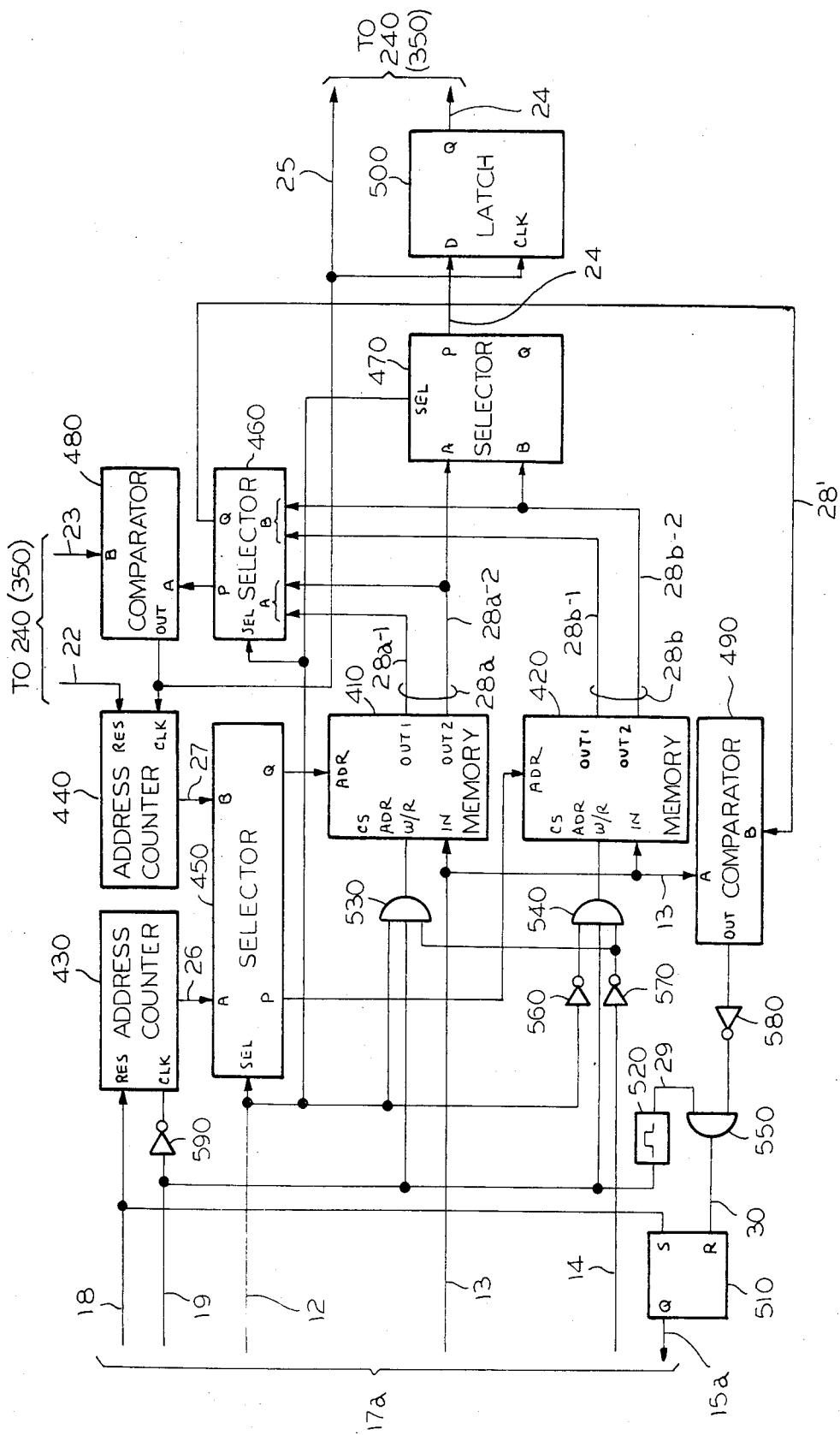
FIG. 10 is a block diagram view illustrating a control memory used for a transmission control memory or a reception control memory in the TDMA equipment in FIG. 6.

Referring to FIG. 10, an example of transmission control memory 250 for the data having the format in FIG. 9, will be described below.

The memory shown in FIG. 10 comprises two memory units 410 and 420 storing the transmission control data I. These units 410 and 420 are alternatively designated as an operating one and a non-operating one, respectively.

To the memory, memory selection signal 12, transmission control data 13, write-in/verifying selection (W/V) signal 14, the address reset signal 18 and the data sampling signal 19 are supplied from the memory controller (380 in FIG. 6). Frame pulses 22 and frame counter signal 23 are also supplied to the memory from the transmission timing generator (240 in FIG. 6) for reading out the transmission control data I from the operating one of two memory units 410 and 420. The read-out control information data 24 and a timing pulse 25 are supplied to transmission timing generator 240.

The address reset signal 18 is applied to a reset terminal of address counter 430, and the data sampling signal 19 is applied to a clock terminal of the counter 430 through an inverter 590.

Address counter 430 is reset to "0" by the address reset signal 18 and counts up the inverted data sampling signal. The counted number in address counter 430 provides address data of the spare one of memory units 410 and 420 for the writing operation and verifying operation.

Another address counter 440 is reset by the frame pulses 22 and counts up timing pulses 25 from a comparator 480. The address counter 440 provides address data of the operating one of memory units 410 and 420 during read-out operation of the burst signal control data therefrom for controlling the burst signal transmission and reception in the TDMA equipment.

A selector 450 is for selectively supplying the address data 26 from address counter 430 and the address data 27 from address counter 440 to respective memory units 410 and 420. The selector 450 has two inputs terminals A and B to which the address data 26 and 27 are inputted, respectively, and two output terminals P and Q which are connected to address input terminals ADR of memory units 410 and 420, respectively. The memory selection (M.S.) signal 12 is applied to a select terminal SEL of selector 450.

When the memory selection (M.S.) signal 12 is "0", input signals applied to A and B terminals are transferred to P and Q terminals, respectively. Accordingly, the address data 26 and 27 are applied to memory units 420 and 410, respectively. As a result, memory unit 410 is as the operating one and memory circuit 420 is set in the non-operating or spare condition.

On the contrary, when the memory selection (M.S.) signal 12 is "1", address data 26 and 27 applied to A and B terminals are transferred to Q and P terminals, respectively, and are supplied to memory units 410 and 420, respectively. Therefore, the memory unit 420 is selected as the operating one and the other memory unit 410 is set in the spare one.

Each memory unit 410 and 420 has a writing and reading selection terminal W/R, a data input terminal IN and two output terminals OUT1 and OUT2. When W/R terminal is held "0", data are read out from the memory unit according to the address data applied to address input terminal ADR. When the data sampling pulses are applied to W/R terminal, the data supplied to data input terminal are written at addresses designated by address data applied to address input terminal ADR of the memory.

The control information data of 4 bits of the burst signal control data are outputted from output terminal OUT1, and the timing information data of 12 bits are outputted from output terminal OUT2.

A data signal 28a read out from memory unit 410 is supplied to an A input terminal of another selector 460, which operates in the similar manner of selector 450. A data signal 28b read out from memory unit 420 is supplied to another B input terminal of selector 460. Control information data signals 28a-2 and 28b-2 of the read-out data signals 28a and 28b are supplied to A and B input terminals of a further selector 470, which also operates in the similar manner as selector 450.

The memory selection (M.S.) signal 12 is applied to a selection terminal SEL of each selector 460 and 470.

When memory selection (M.S.) signal 12 is "0", that is, when memory unit 410 is in the operating condition, data signal 28a from operating memory unit 410 is transferred to a comparator 480, and data signal 38b from the spare memory unit 420 is transferred to another comparator 490, through selector 460. While, one control information data signal 28a-2 is transferred to a latch circuit 500 as the control information data 24 through selector 470.

When memory selection (M.S.) signal 12 is "1", that is, when memory unit 420 is in the operating condition, data signal 28b from operating memory unit 420 is transferred to comparator 480, and data signal 28a from the spare memory unit 410 is transferred to comparator 490 through selector 460. While, one control information data signal 28b-2 is transferred to latch circuit 500 through selector 470.

Namely, the data signal read out from one memory unit in the operating condition is transferred to comparator 480 as the transmission control signal 28, while another data signal read out from the other memory unit in the spare condition is transferred to another comparator 490 as the read-out control data signal 28'.

Comparator 480 receives a count data signal 23 from a frame counter (not shown) in the transmission timing generator (250 in FIG. 4). When the count data signal coincides with the timing information signal 28-1 (28a-1 or 28b-1) of the transmission control data signal 28, a timing pulse 25 is sent out to address counter 440 and latch circuit 500.

As described above, address counter 440 counts up the timing pulse 25.

The burst signal control data (B.S.C.D.) 13 is supplied to a data input terminal IN of each memory unit of 410 and 420.

The data sampling signal 18 is a W/R terminal of each memory unit 410 and 420 through each of AND gates 530 and 540 which are controlled by the memory selector (M.S.) signal 12 and the write-in/verifying selection (W/V) signal 14.

The memory selection (M.S.) signal 12 is directly applied to AND gate 530, but is applied to AND gate 540 through an inverter 560. The write-in/verifying selection (W/V) signal 14 is applied to both AND gates 530 and 540 through an inverter 570.

When the memory selector (M.S.) signal 12 is "0", that is, when memory unit 410 is in the operating condition, the output signal of AND gate 530 is "0", therefore read-out operation of memory unit 410 according to address data from address counter is not barred.

When memory selection (M.S.) signal 12 is "1", that is, when memory unit 420 is in the operating condition, the output signal of AND gate 540 is "0" because the memory selection (M.S.) signal 12 of "1" is applied to an input terminal of AND gate 540 through inverter 560. Therefore, neither the data sampling signal 19 nor the write-in/verifying selection (W/V) signal 14 interferes with the read-out operation of the operating memory unit 420 according to the address data provided by address counter 440.

A writing operation into, and a read-out operation from, memory unit 410 or 420 which is in the spare condition can be switched to each other by the write-in/verifying (W/V) selection signal 14.

When the memory selection (M.S.) signal 12 is "0", that is, when memory unit 420 is in the spare condition, and when the write-in/verifying selection (W/V) signal 14 is "0", the data sampling signal 19 is applied to W/R terminal of memory unit 410 through AND gate 540. As a result, the burst signal control data 13 is written into addresses in memory unit 420 designated by address data 26 from address counter 430 under control of the data sampling signal 19.

Figure 11:
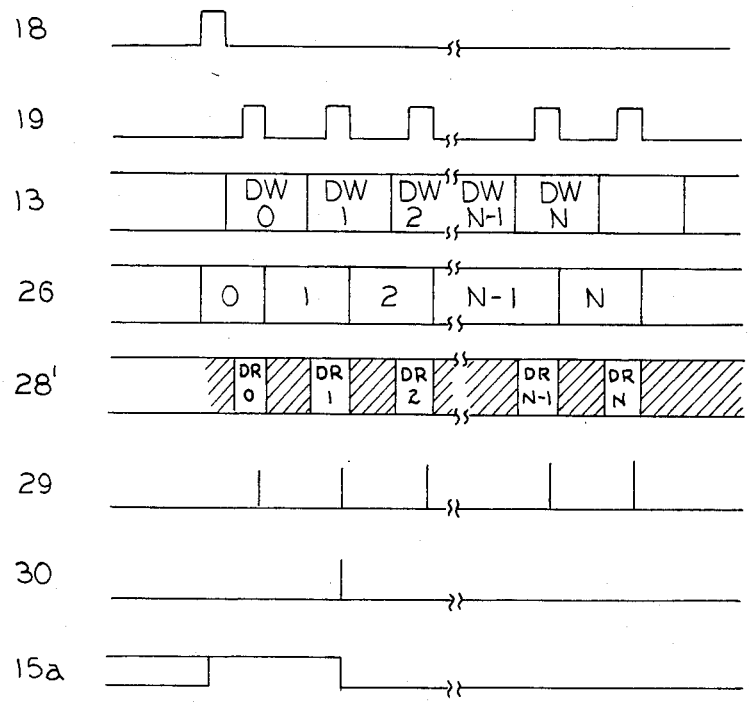
FIG. 11 is a view for illustrating a time relationship between various signals in the memory of FIG. 10 during a writing operation and a verification operation.

The time relationship between the address reset signal 18, the data sampling signal 19, the burst signal control data 13 and the address data 26 is shown in FIG. 11. Words $DW_0$, $DW_1$, $DW_2$, ..., $DW_N$ of the burst signal control data 13 are written into addresses 0, 1, 2, ..., N in the memory.

When the write-in/verifying selection signal 14 is switched to "1", the output of AND gate 540 is "0". Therefore, the data $DR_0$, $DR_1$, $DR_2$, ..., $DR_N$ stored in the non-operating memory unit 420 are read out from addresses 0, 1, 2, ..., N designated by the address data 26 provided from address counter 430, as shown in FIG. 9.

A writing operation and a reading operation are carried out in the similar manner to memory unit 410 which is in the spare condition at a time when the memory selection (M.S.) signal is "1".

As described above, the data read out from memory unit 410 or 420 which is in the spare condition is transferred as the read-out data 28 to comparator 490 through selector 460. The comparator 490 compares the read-out data 28' with the burst signal control data 13, and provides an output signal which is "1" at a time when both of them coincides with each other but "0" when they do not coincide.

The output signal is applied to an input terminal of an AND gate 550 through an inverter 580.

An output signal 29 of a one-shot multivibrator 520 is applied to the other input terminal 550. One-shot multivibrator 520 is driven by a rising end of the sampling pulse 19.

Therefore, when comparator 490 detects non-coincidence, an output signal 29 of AND gate 550 becomes "1" in response to output signal 29 of one-shot multivibrator 520.

A flip-flop circuit 510 has a set terminal S to which the address reset pulse 18 is inputted, and a reset terminal R to which the output signal 30 is applied. An output Q is set to "1" in response to a pulse signal of "1" applied to set terminal S, and is reset to "0" by a pulse signal of "1" applied to reset terminal R.

Therefore, when the comparator 490 detects the non-coincidence, flip-flop circuit 510 is reset and provides the verification result (V.R.) signal 15a of "0" representing the non-coincidence.

When the comparator 490 detects coincidence, the verification result (V.R.) signal 15a is "1" representing the coincidence.

FIG. 9 also shows the signals 29, 30 and 15a, which illustrates a case where non-coincidence is detected at the second word.

The control information data signal 24 is supplied to latch circuit 500, as described above. The signal 24 is latched in latch circuit 500 and is transferred to transmission timing generator 240.

Figure 12:
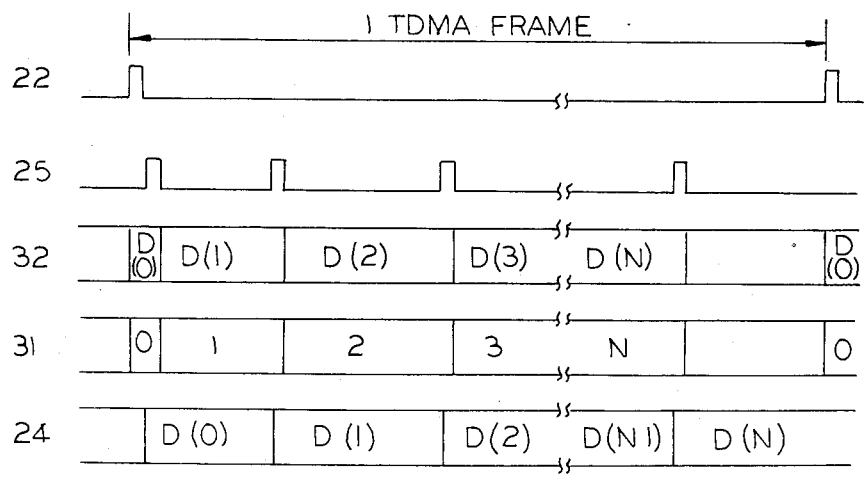
FIG. 12 is a view for illstrating a time relationship between various signals in the memory of FIG. 10 during reading operation from an operating memory unit.

Transmission timing circuit 240 controls multiplexer 210 in dependence on the control information data signal 24 in synchronization with the frame pulse 22 and the timing pulses 25, as shown in FIG. 12.

Referring to FIG. 12, sub-burst control signals (D(0), D(2), ..., D(N)) are produced in dependence on the control information data (D(0), D(1), ..., D(N)). In response to the sub-burst control data, sub-bursts (0, 1, ..., N) 31 are taken into multiplexer.

A memory arrangement similar to the memory of FIG. 10 can be used to the reception control memory 360 in FIG. 6. In the case, frame pulse 22 and frame count data 23 are supplied from reception timing generator 350, and timing pulse 25 and control information data 4 are supplied to reception timing generator 350.

In the embodiment of FIG. 10, the burst signal control data are transferred as a time-parallel data signal from the memory controller to the control memory. But, it is easy to modify the embodiment so that the burst signal control data are transferred as a time-serial data signal.

It is also readily understood by those skilled in the art that a microprocessor can be used for the transmission control memory or the reception control memory.

In the embodiments as described above, the verification result signal has been described as a signal of "1" or "0" for representing the coincidence or the non-coincidence. But, it will be readily made by those skilled in the art to use the burst signal control data as the verification result signal wherein the burst signal control data signal is returned to the supervisory and the control apparatus from the TDMA equipment when the coincidence is detected, and it is not returned when the coincidence signal is not detected.

What is claimed is:

1. In a supervising and controlling system for a communication station in a time-division multiple access (TDMA) communication system comprising a supervisory and control apparatus coupled to a TDMA equipment in the station, said TDMA equipment having two memory means to be used as an operating memory and a spare memory, respectively, each memory means storing transmission and reception burst signal control data for designating a time position and length of each component bursts of each of burst signals transmitted from and received at the TDMA equipment, the improvement wherein:

said supervisory and control apparatus comprises:
control means;
storage means for storing a significant burst signal control data;
means for transmitting, under control of said control means, a memory selection signal to said TDMA equipment for designating one of two memory means to function as an operating memory means while the other of said memory means functions as a spare memory;
means for periodically transmitting, under control of said control means, said significant burst signal control data stored in said storage means to said TDMA equipment;
means for periodically transmitting, under control of said control means, a verification signal to said TDMA equipment for commanding it to verify said significant burst signal control data as transmitted and the content stored in said memory means;
means responsive to the transmission of said burst signal control data for measuring an elapsed time and for thereafter producing a time-over signal after a lapse of a predetermined time period from the transmission of said burst signal control data; and means responsive to said time-over signal for detecting a coincidence signal caused by verification at said TDMA equipment in response to said time-over signal, said coincidence signal detecting means providing a non-coincidence signal upon detecting no coincidence signal; and
wherein said TDMA equipment comprises:
means for switching said two memory means between an operating condition and a spare condition, respectively, in response to said memory selection signal;
means for reading out the content in one of said two memories which is switched to the spare condition in response to said verification signal; and
means for comparing said burst signal control data transmitted from said supervisory and control apparatus to said TDMA equipment and the readout data, and, on coincidence of both data, for generating the coincidence signal.

2. The supervising and controlling system as claimed in claim 1, wherein said supervisory and control apparatus further comprises means for transmitting, under control of said control means, a writing signal to said TDMA equipment for commanding said equipment to write said significant burst control data as transmitted into said memory means, said TDMA equipment further comprising means responsive to said writing means for writing said significant burst signal control data into one of said two memories which is switched to the spare condition.

3. The supervising and controlling system as claimed in claim 2, wherein said control means drives said writing signal transmitting means and said significant burst signal control data transmitting means in response to said non-coincidence signal.

4. The supervising and controlling system as claimed in claim 3, wherein said control means drives said verification signal transmitting means in place of said writing signal transmitting means, and said significant burst signal control data transmitting means, after a predetermined time period from driving said writing signal transmitting means.

5. The supervising and controlling system as claimed in claim 1, wherein said supervisory and control apparatus further comprises alarm indicating means, said control means driving said alarm indicating means in response to said non-coincidence signal.

6. The supervising and controlling system as claimed in claim 1, wherein said coincidence signal detecting means provides a coincidence detect signal upon detecting the coincidence signal, and said control means changes, in response to said coincidence detect signal, said memory selection signal so that the operating condition and the spare condition of said two memory means are changed with respect to each other.

7. In a supervising and controlling system for a communication station in a TDMA communication system comprising a supervisory and control apparatus coupled to two TDMA equipments to be used with an operating one of said TDMA equipments, and the other of said TDMA equipments then being in a stand-by condition, respectively, in the station, each of said TDMA equipments having two memory means with either one of said memory means operating and the other of said memory means standing by as a spare, respectively, each memory means storing burst signal control data for designating a time position and a length of burst signals transmitted from and received at the communication station, the improvement wherein:

said supervisory and control apparatus comprises:
control means;
means for transmitting, under control of said control means, an operating/stand-by selection signal to each of said two TDMA equipments for designating an operating condition or a stand-by condition of each TDMA equipment;
atorage means for storing significant burst signal control data;
means for transmitting, under control of said control means, a memory selection signal to each of said TDMA equipments for designating one of two memory means therein as an operating memory means with the other memory means as a spare one;
means for periodically transmitting, under control of said control means, said significant burst signal control data stored in said storage means to each of said TDMA equipments;
means for periodically transmitting, under control of said control means, a verification signal to each of said TDMA equipments for commanding said equipments to verify said significant burst signal control data as transmitted and the content stored in said memory means therein;
means responsive to the transmission of said burst signal control data for measuring an elapsed time and producing a time-over signal after a lapse of a predetermined time period from the transmission of said burst signal control data; and
means responsive to said time-over signal for detecting a coincidence signal caused by verification at each of said TDMA equipments, said coincidence signal detecting means providing a coincidence detecting signal upon detecting the coincidence signal; and wherein each of said TDMA equipments comprises:
means for switching said two memory means between an operating condition and a spare condition, respectively, in dependence on said memory selection signal;
means responsive to said verification signal for reading out the content in one of said two memories which is then switched to the spare condition; and
means for comparing said burst signal control data transmitted from said supervisory and control apparatus and the read-out data, and, on coincidence of both data, for generating the coincidence signal.

8. The supervising and controlling system as claimed in claim 7, wherein said supervisory and control apparatus further comprises means for transmitting, under control of said control means, a writing signal to each of said TDMA equipments for commanding it to write said significant burst control data as transmitted into said memory means therein, each of said TDMA equipments further comprising means responsive to said writing signal for writing said significant burst signal control data as transmitted into one of said two memories therein which is switched to the spare condition.

9. The supervising and controlling system as claimed in claim 8, wherein said coincidence signal detecting means provides a non-coincidence signal when no coincidence signal is detected from at least one of said TDMA equipments, said control means driving said writing signal transmitting means in place of said verification signal transmitting means in response to said non-coincidence signal, and said significant burst signal control data transmitting means so as to transmit said writing signal and said significant burst signal control data to said at least one TDMA equipment.

10. The supervising and controlling system as claimed in claim 9, wherein said control means drives said verification signal generating means in place of said writing signal transmitting means so as to transmit said verification signal and said significant burst signal control data stored in said storage means to said at least one TDMA equipment, after a predetermined time period from driving said writing signal transmitting means.

11. The supervising and controlling system as claimed in claim 7, wherein said supervisory and control apparatus further comprises alarm indicating means, said alarm indicating means being driven when no coincidence signal from at least one of said TDMA equipments is detected at said coincidence signal detecting means.

12. The supervising and controlling system as claimed in claim 9, wherein, when said coincidence signal detecting means detects no coincidence signal from one of said TDMA equipments which is selected to be the operating condition, said control means drives said operating/stand-by selection signal transmitting means to transmit a stand-by selection signal to said one TDMA equipment and an operating selection signal to the other one of said TDMA equipment.

13. The supervising and controlling system as claimed in claim 7, wherein said control means changes, in response to said coincidence detecting signal, said memory selection signal so that the operating condition and the spare condition of said two memory means are changed to each other.

* * * * *